March 19, 1940. H. N. OTT 2,194,366
PROJECTOR
Filed Oct. 13, 1937 2 Sheets-Sheet 1
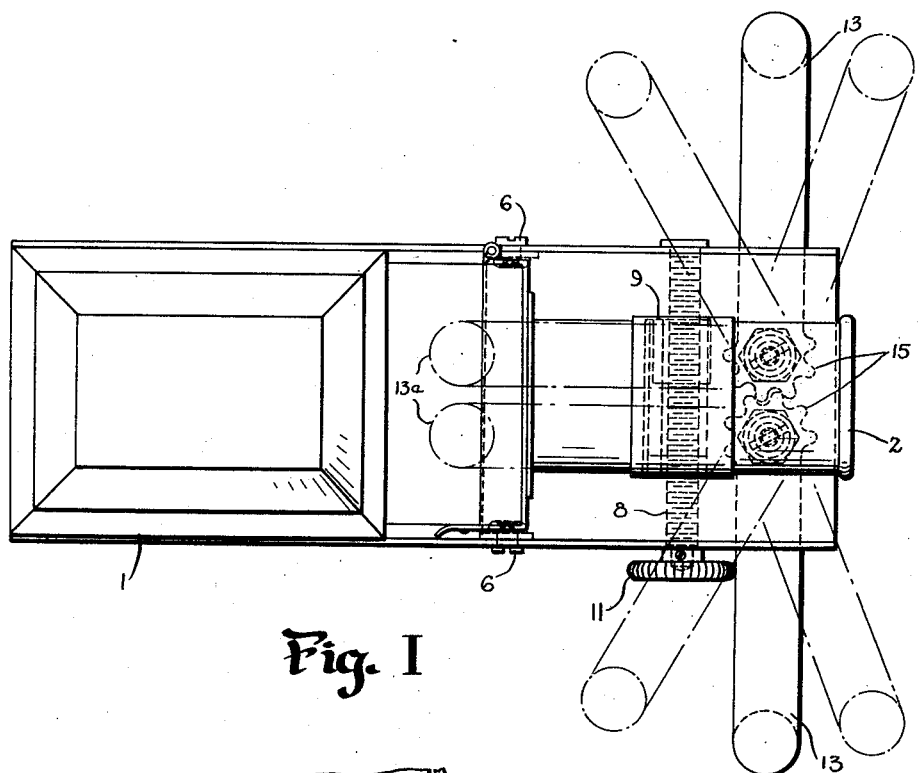
Fig. I
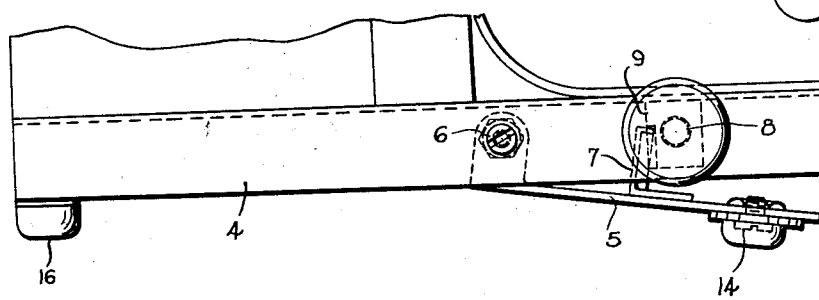
Fig. VI
INVENTOR
HARVEY N. OTT
BY
Harry H. Stull
ATTORNEY

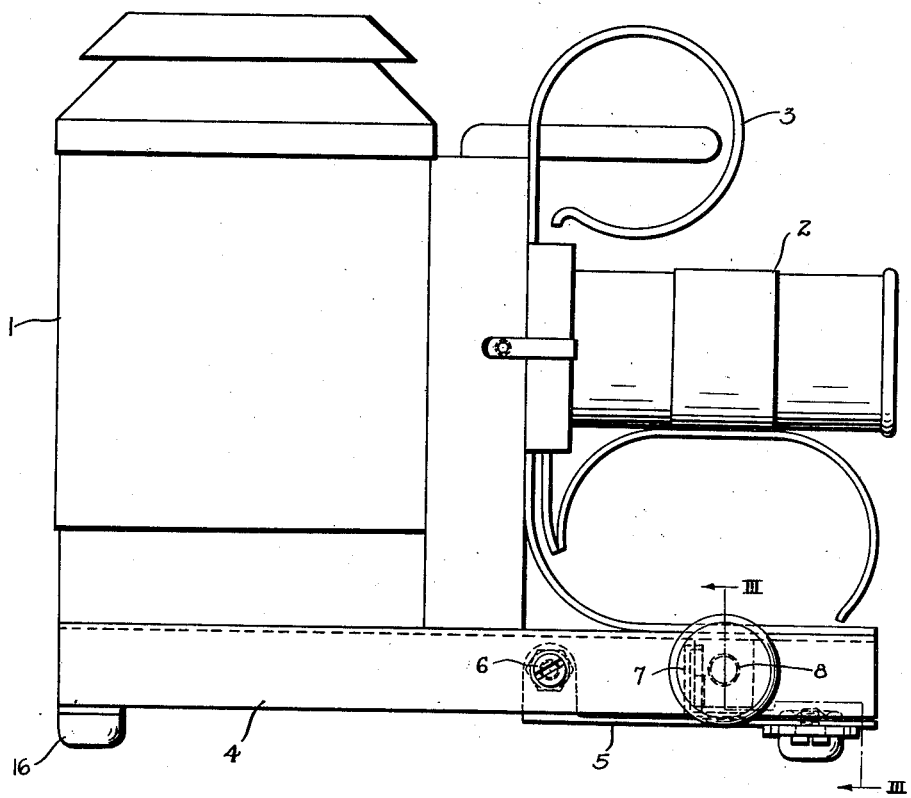
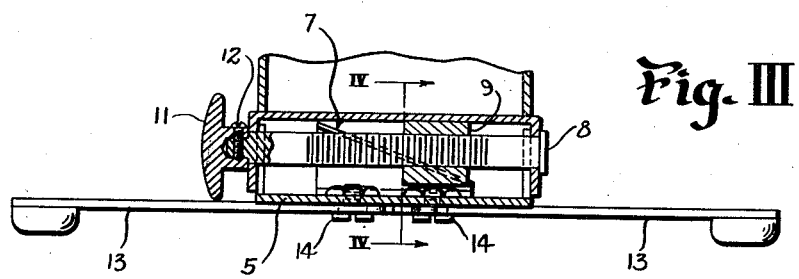
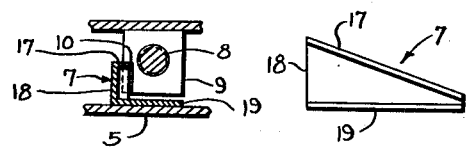

Patented Mar. 19, 1940

2,194,366

UNITED STATES PATENT OFFICE 2,194,366

PROJECTOR

Harvey N. Ott, Buffalo, N. Y., assignor to Spencer Lens Company, Buffalo, N. Y., a corporation of New York Application October 13, 1937, Serial No. 168,754

4 Claims. (Cl. 88—24)

This invention relates to adjustable supports for projectors and in particular to raising and lowering mechanisms and adjustable legs.

The main object of this invention is to provide an even, smooth, means for adjusting the optical axis of a projector so that the image on the screen may be smoothly raised or lowered at the will of the operator.

Another object of this invention is to provide means for raising or lowering the optical axis of a projector, said means being of the type which breaks the normal line of the projector base to form an inverted V.

Another object is to provide means whereby the optical axis of the projector may be raised or lowered a small amount and the image on the screen may be accurately positioned.

Another object of this invention is to provide means for raising or lowering the optical axis of a projector, said raising or lowering being accomplished by the use of an inclined plane operated by a horizontal screw device.

Another object is to provide an adjustable support for a projector whereby the adjustment is simplified by limiting it to the front portion of said projector.

Another object is to provide an adjustable support for a projector which comprises a lower lip portion which may be opened by the use of an inclined plane in conjunction with a horizontal screw device, thus raising the projector.

Another object of this invention is to provide vertical adjustment means for a projector whereby both sides of said projector may be raised or lowered together, thus maintaining perfect balance.

Another object of this invention is to provide means whereby the projector is stabilized, that is, legs which may be adjusted to the most advantageous position for supporting the projector.

Another object of this invention is to provide front legs for a projector which support said projector with perfect balance in a variety of positions.

Still another object of this invention is to provide adjustable supporting means for a projector consisting of forelegs which are geared together so that their positions are always opposite and similar.

Referring to the drawings, which illustrate the preferred arrangement:

Fig. I is a plan view, showing the main body of the device, and showing the adjustable front legs in four possible positions;

Fig. II is a side elevation of a projector embodying this elevation, showing the main body of the projector, the lens tube forward of this body portion, and the film guide means;

Fig. III is a sectional view taken on line III—III of Fig. II;

Fig. IV is another sectional view taken on line IV—IV of Fig. III;

Fig. V is a side elevation of the inclined plane member; and

Fig. VI is a partial side elevation showing the elevating lip portion partly opened.

Referring more particularly to the drawings in which like figures designate like parts throughout, the main body portion of the projector 1, the lens system 2, and the film guiding means 3 are supported by a base having portions 4 and 5 hinged together. In this, the preferred form of my invention, the portion 4 is the main base and the other portion is in the form of a lip 5. This lip 5 is hinged or pivoted horizontally at the point 6, thus allowing it to open or separate from the main base portion 4, as shown in Fig. VI. This lip 5 may be opened or closed to raise or lower the optical axis of the projector by means of a mechanism which is a combination of an inclined plane 7 and a horizontal screw 8. This screw 8 carries a threaded block or nut 9 which has a cut out portion 10 which engages the inclined surface of the inclined plane 7. The screw 8 is provided at one end with a knob 11 which is fixed to the screw by means of a set screw 12.

The operation of this mechanism is as follows: Starting with the lip 5 in closed or unbent position as shown in Fig. II; by turning the screw knob 11 the threaded block or nut 9 is advanced along the threads of the screw 8 and consequently up the inclined plane 7. This action forces the lip 5 away from the main base portion 4, as shown in Fig. VI, and raising the front portion of the projector. To lower the front of the projector, simply reverse the motion of the knob 11 and the block 9 proceeds down the inclined plane 7 and the lip 5 approaches the main base portion 4.

In its preferred form the threaded block 9 has a square or rectangular cross section and is kept positioned without turning about the screw axis while progressing either up or down the inclined plane. As shown in Fig. V, the bracket 7 which forms the inclined plane is preferably formed with its upper or inclined plane portion 17 extending at right angles to, and inwardly from, its upright portion 18 into the cut out portion of the block 9. The bracket 7 has a base portion 19 which rests on the lip 5 and extends in the same direction as the inclined portion 17.

In conjunction with the lowering and raising mechanism just described, rest members are provided for engaging a table or the like. The forward rest members 13 are here shown as legs which are pivotally attached at the point 14 to the lip portion 5. The legs 13 are provided with gear portions 15, which are meshed as shown in Fig. I. This pivoting and gearing arrangement allows the legs 13 to be moved to a number of different positions, while at the same time keeping the legs in oppositely similar positions, thus giving balanced support to the projector in whatever position they are placed. These legs 13 may also be turned under the projector as indicated at 13a, for convenience in packing. The rear rest members 16 are not adjustable, acting merely as supports.

By changing the angle of the inclined plane, the adjustment may be made coarser or finer, as desired.

From the foregoing it will be seen that simple, efficient, and economical means have been provided for accomplishing all of the objects and advantages of the invention, particularly that of providing an even, smooth, means for adjusting the optical axis of a projector so that the image on the screen may be smoothly raised or lowered at the will of the operator.

Having described my invention, I claim:

1. In a projector, a base, a lip portion hinged transversely of said base, adjustment means comprising a wedge member secured to the said lip portion and having a surface forming an inclined plane therewith, a screw member disposed in substantially parallel relation with the hinge of the lip portion and having its ends rotatably supported on the base, and a block-like member threaded on said screw member for movement transversely of said base by rotation of said screw member, said block-like member having an inclined surface cooperating with and bearing on the said inclined plane surface of the said wedge member, whereby rotation of the said screw member causes said block-like member to progress transversely of said base along said screw, thereby causing the said inclined surfaces to slidably act on each other to cause said lip to move about its hinge connection with said base.

2. In a projector, a base, a lip portion hinged adjacent one of its ends to said base so that its opposed end will swing toward and away from said base, adjustment means comprising a wedge member having a right angled foot secured to said lip portion and having an inclined upper edge portion, a screw member disposed in substantially parallel relation with the axis of the hinge of the lip portion and having its ends rotatably supported on the base, and a block-like member threaded on said screw member for movement transversely of said base and having a recessed inclined surface resting on the inclined upper edge portion of the wedge with the said upper edge portion lying within said recess whereby varied adjusted relations of said inclined surfaces, as brought about by adjustment of said screw member, will shift the position of the lip relative to said base.

3. In a projector, a base, a lip portion hinged transversely of said base, adjustment means comprising a wedge member secured to the said lip portion, a screw member disposed in substantially parallel relation with the hinge of the lip portion and having its ends rotatably supported on the base, and a block-like member threaded on said screw member for movement transversely of said base, and having an inclined surface resting on said wedge, said wedge having a bottom portion rigidly attached to said lip and a substantially triangular shaped portion providing a surface inclined to the horizontal, said block-like member having a contact portion in engagement with the inclined surface of the triangular shaped portion, finger-like rest members pivotally attached to said lip portion and extending outwardly therefrom, and gear portions integral with said rest members adjacent the pivots thereof, said gear portions being meshed together so that any movement of one rest member about its pivot causes a corresponding movement of the other rest member.

4. In a projector, a base, a lip portion hinged transversely of said base, adjustment means comprising a wedge member secured to the said lip portion and having a surface forming an inclined plane therewith, a screw member disposed in substantially parallel relation with the hinge of the lip portion and having its ends rotatably bearing on the base, a block-like member supported by and threaded on said screw member for movement transversely of said base and having an inclined surface adapted to rest on the said inclined plane surface of the wedge, finger-like rest members pivotally attached to said lip portion and extending outwardly therefrom and interconnected so that any movement of one rest member about its pivot causes a corresponding movement of the other rest member.

HARVEY N. OTT.